(12) United States Patent
Welch et al.

(10) Patent No.: US 10,795,961 B2
(45) Date of Patent: Oct. 6, 2020

(54) ACCESSING SPECIFIC PORTIONS OF DOCUMENTS ON A NETWORK

(71) Applicant: International Business Machines Corporation, Armonk, NY (US)

(72) Inventors: Doug Welch, Mannford, OK (US); Dara Murphy, Galway (IE); Lisa Marie Towles, Oakland, CA (US); Michael Eagleson, Marietta, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/991,108

(22) Filed: May 29, 2018

(65) Prior Publication Data

US 2019/0370403 A1    Dec. 5, 2019

(51) Int. Cl.
| | | |
|---|---|---|
| *G06F 17/00* | (2019.01) | |
| *G06F 16/955* | (2019.01) | |
| *G06F 16/93* | (2019.01) | |
| *G06F 16/954* | (2019.01) | |
| *G06F 40/134* | (2020.01) | |
| *G06F 16/958* | (2019.01) | |

(52) U.S. Cl.
CPC .......... *G06F 16/9566* (2019.01); *G06F 16/94* (2019.01); *G06F 16/954* (2019.01); *G06F 40/134* (2020.01); *G06F 16/958* (2019.01)

(58) Field of Classification Search
CPC .... G06F 16/94; G06F 16/954; G06F 17/2235; G06F 16/9566; G06F 16/958; G06F 40/134; G06F 40/169
See application file for complete search history.

(56) References Cited

U.S. PATENT DOCUMENTS

| | | | | |
|---|---|---|---|---|
| 8,042,036 B1* | 10/2011 | Sharma | ............... | G06F 16/9558 715/208 |
| 8,910,060 B2* | 12/2014 | Chandra | ............. | G06F 17/2247 715/760 |
| 2004/0205490 A1* | 10/2004 | Haeuptle | ............. | G06F 16/9566 715/205 |
| 2005/0149576 A1* | 7/2005 | Marmaros | ............. | G06F 16/957 |
| 2005/0149851 A1* | 7/2005 | Mittal | ................. | G06F 17/2235 715/205 |
| 2007/0027887 A1* | 2/2007 | Baldwin | ................. | G06F 40/35 |
| 2007/0099162 A1* | 5/2007 | Sekhar | ................... | G06Q 30/02 434/323 |
| 2009/0292981 A1* | 11/2009 | Akiyama | .............. | G06F 40/166 715/226 |
| 2010/0131903 A1* | 5/2010 | Thomson | .................. | G06F 8/38 715/847 |
| 2012/0047423 A1* | 2/2012 | Tomkow | ............... | G06F 17/241 715/205 |

(Continued)

*Primary Examiner* — Laurie A Ries
(74) *Attorney, Agent, or Firm* — Jeffrey Kelly; Edell, Shapiro & Finnan, LLC

(57) ABSTRACT

A computer system accesses a document. A client is navigated to a document specified in a link. One or more display instructions specified by the link are executed to modify the document, wherein the one or more display instructions comprise instructions to navigate to a specific position in the document. The modified document is presented. Embodiments of the present invention further include a method and program product for accessing a document using a precision URL in substantially the same manner described above.

18 Claims, 6 Drawing Sheets

(56) References Cited

U.S. PATENT DOCUMENTS

| | | | |
|---|---|---|---|
| 2013/0117675 A1* | 5/2013 | Twig | G06F 3/048 |
| | | | 715/737 |
| 2014/0013197 A1* | 1/2014 | McAfee | G06F 17/2235 |
| | | | 715/208 |
| 2014/0281877 A1* | 9/2014 | Burge | G06F 16/958 |
| | | | 715/230 |
| 2014/0304618 A1* | 10/2014 | Carriero | H04L 12/1818 |
| | | | 715/753 |
| 2015/0161111 A1* | 6/2015 | Lueck | G06F 16/957 |
| | | | 705/2 |
| 2015/0244699 A1* | 8/2015 | Hessler | G06F 21/44 |
| | | | 726/7 |
| 2016/0147718 A1* | 5/2016 | Spyropoulos | G06F 16/9577 |
| | | | 715/205 |
| 2017/0286373 A1* | 10/2017 | Bauchot | G06F 17/2241 |
| 2018/0046602 A1* | 2/2018 | Sisson | G06F 40/166 |
| 2018/0330169 A1* | 11/2018 | van Hoof | G08B 13/19613 |
| 2018/0357779 A1* | 12/2018 | Teittinen | G01C 21/367 |
| 2019/0155884 A1* | 5/2019 | Liu | G06F 40/205 |
| 2019/0354263 A1* | 11/2019 | Chopra | G06F 3/0482 |

* cited by examiner

400

...
Line 405
Line 406
Line 407
Line 408
Line 409
Line 410
Line 411
Line 412
Line 413
Line 414
Line 415
Line 416
Line 417
...

...
Line 405
Line 406
Line 407
Line 408
Line 409
Line 410
Line 411
Line 412
Line 413
Line 414
Line 415
Line 416
Line 417
...

ACCESSING SPECIFIC PORTIONS OF DOCUMENTS ON A NETWORK

BACKGROUND

Present invention embodiments relate to document access, and more specifically, to accessing specific portions of documents residing on a network.

Network resources, such as websites, servers, and databases, are typically accessed using a reference address that directs a web browser to the location of the network resource on a network. For example, a hyperlink is a type of reference address that points a browser to a particular hypertext file or document, such as a web page. Users can create and send hyperlinks in order to facilitate the sharing of web pages with others.

When a user bookmarks a hyperlink for later use or sends a hyperlink to a friend, the hyperlink typically directs a web browser to the beginning of the linked document. When a document is especially lengthy, it can be difficult for a recipient to locate a specific portion of interest in the document.

SUMMARY

According to an embodiment of the present invention, a computer system accesses a document. A client is navigated to a document specified in a link. One or more display instructions specified by the link are executed to modify the document, wherein the one or more display instructions comprise instructions to navigate to a specific position in the document. The modified document is presented. Embodiments of the present invention further include a method and program product for accessing a document using a precision URL in substantially the same manner described above.

BRIEF DESCRIPTION OF THE DRAWINGS

Generally, like reference numerals in the various figures are utilized to designate like components.

FIGS. 4A-4D depict examples of a document accessed using a precision uniform resource locator in accordance with an embodiment of the present invention.

DETAILED DESCRIPTION

Present invention embodiments relate generally to document access, and more specifically, to accessing specific portions of documents residing on a network. When a document on a network resource, such as a web page on a web server, is particularly lengthy, it may be difficult to locate a specific portion of interest in the document. Instead, when a user shares a link, the user may include instructions such as to search for a particular phrase, which will enable a recipient to manually skip to the relevant portion of the document. Present invention embodiments enable direct linking to any specific portion of a document on a network resource by employing precision uniform resource locators (URLs) or other identifiers. By employing precision URLs, users can directly link to any arbitrary location in a document on a network resource, thereby reducing the amount of time and computing resources required to navigate to a specific portion of a document compared to conventional hyperlinking.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Figure 1:
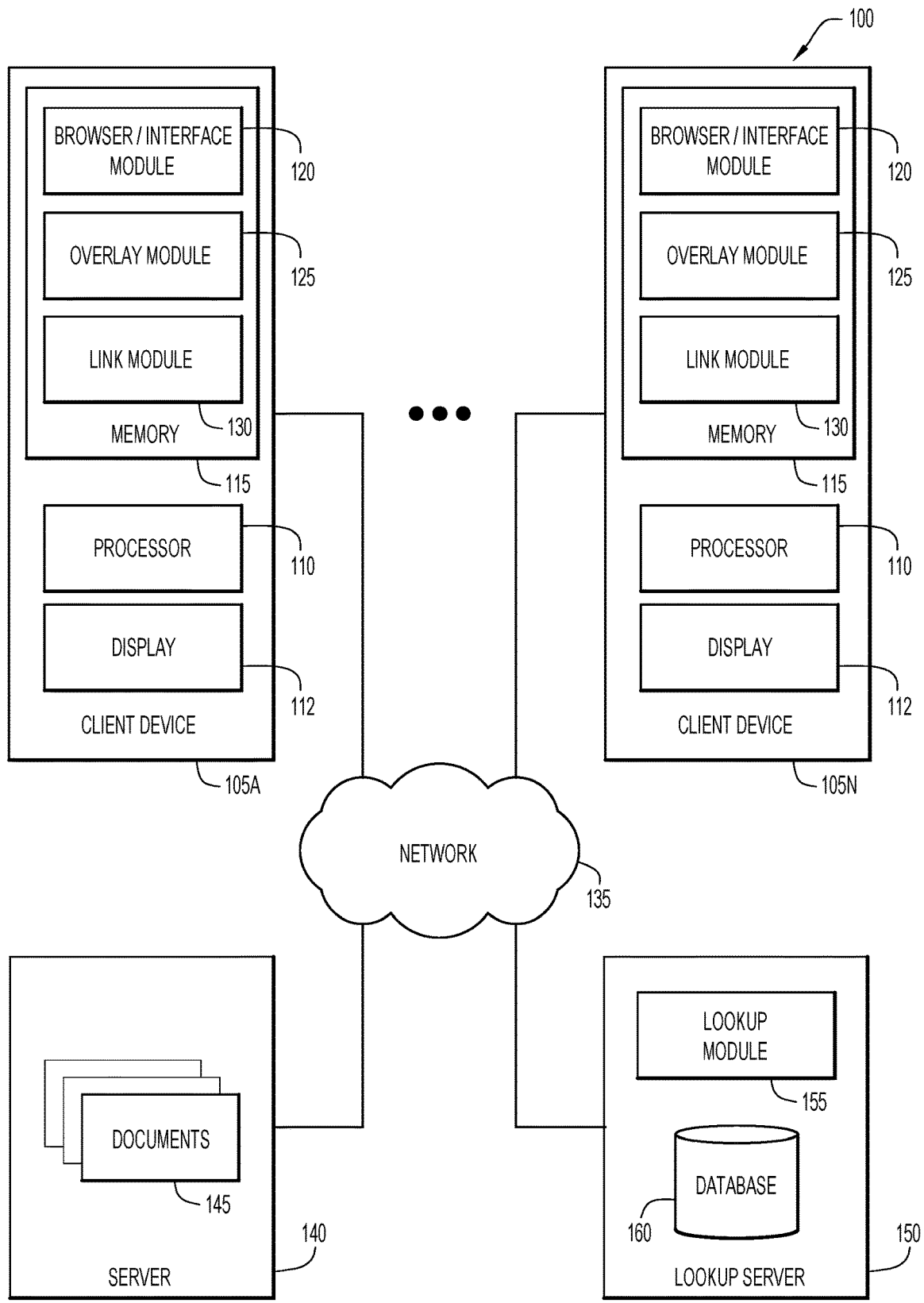
FIG. 1 is a block diagram depicting a computing environment for precision linking in accordance with an embodiment of the present invention.

Present invention embodiments will now be described in detail with reference to the Figures. FIG. 1 is a block diagram depicting a computing environment 100 for precision linking in accordance with an embodiment of the present invention. As depicted, computing environment 100 includes one or more client devices 105A-105N, a network 135, a server 140, and a lookup server 150. Computing environment 100 may enable users to more efficiently collaborate on projects by enabling users to access specific information contained within a much larger amount of information.

Client device 105 may include a processor 110, a display 112, and memory 115 with a browser/interface module 120, an overlay module 125, and a link module 130. In various embodiments of the present invention, client 105 may include a laptop computer, a tablet computer, a netbook computer, a personal computer (PC), a desktop computer, a personal digital assistant (PDA), a smart phone, a thin client, or any programmable electronic device capable of executing computer readable program instructions. Client 105 may include internal and external hardware components, as depicted and described in further detail with respect to FIG. 5.

Browser/interface module 120, overlay module 125, and link module 130 may include one or more modules or units to perform various functions of present invention embodiments described below. The modules may be implemented by any combination of any quantity of software and/or hardware modules or units, and may reside within memory 115 of client device 105 for execution by a processor, such as processor 110.

Browser/interface module 120 may include any application for retrieving, presenting, and traversing documents that are accessible over a network, such as an intranet or the World Wide Web. A user of client device 105 may use browser/interface module 120 to access and browse documents on a server, such as documents 145 of server 140. Browser/interface module 120 may display documents 145 on display 112 of client device 105. Browser/interface module 120 may include any conventional or other web browser software.

Overlay module 125 and link module 130 may each integrate with browser/interface module 120 in order to provide support for precision URLs. In some embodiments, overlay module 125 and/or URL module 130 are plug-in software components of browser/interface module 120. Overlay module 125 and URL module 130 may be bundled together as a single plug-in software component to browser/interface module 120.

Overlay module 125 may overlay a displayed document with another layer that provides navigation capabilities, display of comments, and other features, such as highlighting or isolating a specified portion of a document. In some embodiments, overlay module 125 embeds the displayed document as an element inside of an overlay layer. For example, overlay module 125 may embed the displayed resource inside of a Hypertext Markup Language (HTML) element that can be used as a container for the web page, such as an iFrame. By embedding a displayed documents inside of a container, overlay module 125 may overlay an invisible layer in which to execute instructions that are associated with a precision URL or other link. For example, a precision URL may contain instructions that cause overlay module 125 to jump the embedded document to a particular portion of a document. Overlay module 125 may also display comments associated with the linked document in the overlay layer.

Link module 130 may generate precision URLs that link to specific portions of documents hosted by a server, such as server 140. A precision URL may include an address that points to a document, such as a web page, as well as display instructions that indicate a particular portion of the remote resource. A precision URL may separate the network address of a document from the display instructions that indicate the particular portion of the remote resource by appending the display instructions to the end of the document's network address; the display instructions may be indicated as such by including a special character as an indicator (for example, "?" or "#"). For example, a precision URL may take the format of www.example.com/document?location, with www.example.com directing to a network resource (in this example, a website), "document" specifying the particular document (in this example, a web page), and "location" specifying a location within the document to which the precision URL links.

In some embodiments, link module 130 generates a precision URL at the request of a user by detecting the current location in a document that the user is viewing using browser/interface module 120 and overlay module 125. For example, if the user is viewing a document, overlay module 125 may determine the location of the displayed portion of the document using a predefined reference point, such as the top-left-most portion in display. For documents having multiple pages, a page number may indicate the particular page on which the reference point is located. Precision URL module may locate a portion of a document according to user input. For example, a user may select text with an input device, or right-click or long-tap on a particular area of a document in order to indicate a location to which the precision URL should point.

Link module 130 may define a location using a coordinate system. For example, a location in a document may be referenced by according to its distance away from a datum or reference point. The coordinate system may also indicate a page in which the location of interest may be found. In some embodiments, the reference point may be a corner of the document, such as a top-left, top-right, bottom-left, or bottom-right corner, and the distance may be measured in number of character spaces, words, lines, or pixels away from the reference point (for distances measured in pixels, the number of pixels of a document may be normalized to a particular baseline to account for different pixel counts when a document is rendered by different browsers or displayed on displays having different pixel densities and/or dimensions). Link module 130 may link to a specific location in a document by including a secondary URL within the precision URL that points to the specific location. In some embodiments, link module 130 provides a precision URL with a command that causes browser/interface module 120 to scroll to a specific location in a document, such as a JavaScript® command like window.scrollTo(xpos,ypos), where "xpos" and "ypos" indicate an x-coordinate position and y-coordinate position, respectively. A jQuery command may also be used to cause browser/interface module 120 to scroll to a particular location in a document. Unlike traditional hyperlinks, a precision URL may be created to link to any arbitrary position with a document regardless of the presence of any anchor or reference feature within the document.

Display 112 may include any output device for presenting information in a visual form, such as a liquid crystal display (LCD) or a light-emitting diode (LED) display. Client device 105 may use display 112 to display documents that are accessed using browser/interface module 120.

Network 135 may include a local area network (LAN), a wide area network (WAN) such as the Internet, or a combination of the two, and includes wired, wireless, or fiber optic connections. In general, network 135 can be any combination of connections and protocols that will support communications between client devices 105, server 140, and lookup server 150 in accordance with embodiments of the present invention.

Server 140 may include any network-accessible resource, such as a web server, that hosts one or more documents 145. Server 140 may include a laptop computer, a tablet computer, a netbook computer, a personal computer (PC), a desktop computer, a personal digital assistant (PDA), a smart phone, a thin client, or any programmable electronic device capable of executing computer readable program instructions. Server 140 may include internal and external hardware components, as depicted and described in further detail with respect to FIG. 5.

Documents 145 may include any documents hosted on server 140, such as web pages, hypertext or traditional text documents, and Portable Document Format (PDF) documents. When a user of client device 105 activates a hyperlink pointing to a document such as document 145, browser/interface module 120 may send a request to server 140, which then shares the requested document 145 with client device 105. Link module 130 may generate precision URLs that direct a browser to a specific location within a document 145.

Lookup server 150 may include a lookup module 155 and a database 160. Lookup server 150 may be a laptop computer, a tablet computer, a netbook computer, a personal computer (PC), a desktop computer, a personal digital assistant (PDA), a smart phone, a thin client, or any programmable electronic device capable of executing computer readable program instructions. Lookup server 150 may include internal and external hardware components, as depicted and described in further detail with respect to FIG. 5. Lookup server 150 may receive requests from a client device 105 to associate additional information with a precision URL, such as comments or special instructions for presenting the document specified by the precision URL.

Lookup module 155 may associate additional information with precision URLs for later retrieval. For example, when a user creates and shares a precision URL, the user may wish to add additional information, such as a user-provided comment, to be displayed adjacent to the linked location. However, encoding the text of a comment into a precision URL may lead to an extremely lengthy precision URL, so a lookup code may instead be included in the precision URL. Thus, when client device 105 opens a precision URL, client device 105 may send the lookup code to lookup server 150, and lookup module 155 may retrieve the additional information corresponding to the lookup code, such as the text of a comment, and send the additional information to the requesting client device 105. The additional information that may accompany a precision URL may include comments provided by a user, highlighting or font-related settings, or other instructions, such as whether to display only the portion of a document specified by a precision URL, along with any other metadata.

Database 160 may include any non-volatile storage media known in the art. For example, database 160 can be implemented with a tape library, optical library, one or more independent hard disk drives, or multiple hard disk drives in a redundant array of independent disks (RAID). Similarly, data on database 160 may conform to any suitable storage architecture known in the art, such as a file, a relational database, an object-oriented database, and/or one or more tables. Lookup server 150 may store additional information that is associated with a precision URL on database 160, along with a lookup code corresponding to the additional information. The additional information may include any content that a user may wish to include along with a precision URL, including instructions regarding how to display the content to which a precision URL may point.

Figure 2:
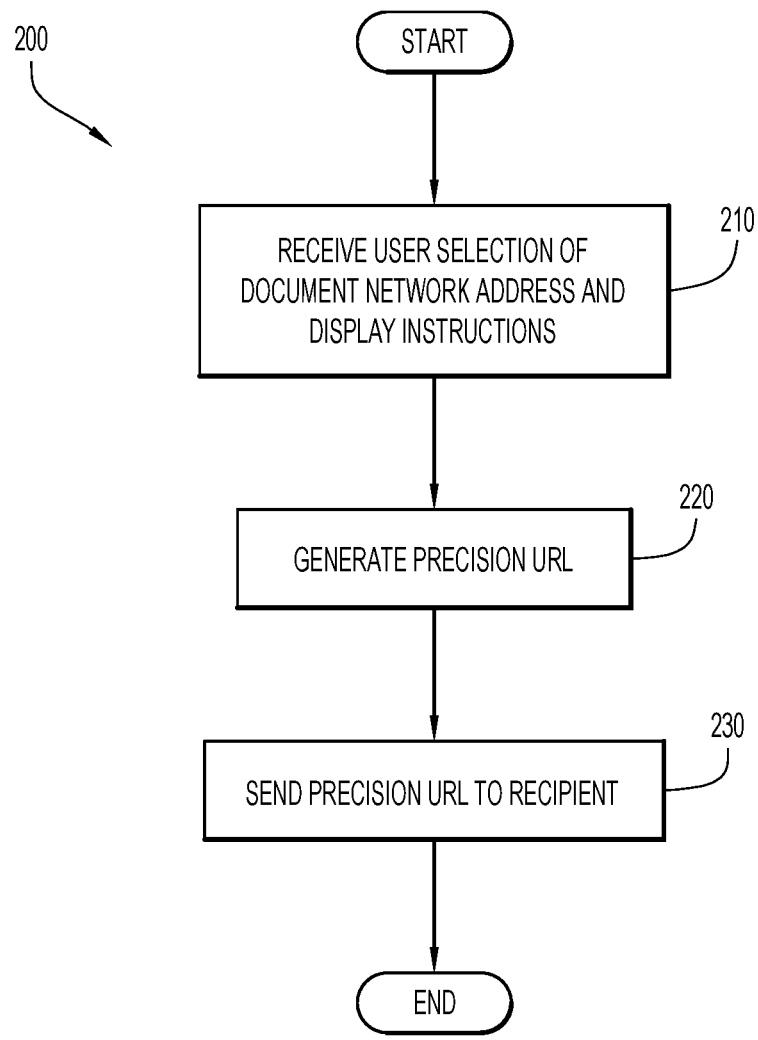
FIG. 2 is a flow chart depicting a method of generating a precision uniform resource locator in accordance with an embodiment of the present invention.

FIG. 2 is a flow chart depicting a method 200 of generating a precision URL in accordance with an embodiment of the present invention.

A user selection of a document and display instructions is received at operation 210. A user of client device 105 may select a document, such as a web page, that the user is currently viewing in a browser. For example, a user of client device 105A may select a document 145 of server 140 that the user is browsing using browser/interface module 120. The display instructions may include instructions to direct a browser to a specific location in the selected document. In some embodiments, when a user selects a document, the user is presented with an option to select a location in the document to which a precision URL may link. A user may use any input device associated with client device 105, such as a keyboard, mouse, touchscreen, joystick, and the like. Once a user selects a location in the document, the user may be presented with an option to generate a precision URL to the selected location. For example, a user may right-click on a specific location of a web page to open a menu that lists one or more options, including an option to generate a precision URL that directly links to the selected location.

Along with specifying a location within a document, the display instructions may also include instructions for how to present the linked document. A user may select one or more options for the display instructions, including isolating a portion of a document, highlighting, emboldening, or italicizing a portion of a document, circling a portion of a document, adding a comment to a portion to a document, and combinations thereof. A user may select one or more options for the display instructions before or after the user selects the specific location in the document for the precision URL. For example, when a user selects a location in a document for linking with a precision URL, the user may choose to have that portion of the document highlighted, circled, isolated, emboldened, and/or italicized, and the user may also add a comment, such as "this paragraph is interesting," that will be presented alongside the linked portion of the document when another user views the precision URL.

A precision URL is generated at operation 220. When a user provides a selection of a document and display instructions for the document, link module 130 may generate a precision URL that includes the network address of the document along with the display instructions. The location of the selected portion of interest in a document is specified in the display instructions, along with any presentation details for the document, including highlighting, comments, and the like. A precision URL may separate the document's network address from the display instructions that indicate the particular portion of interest in the document by appending the display instructions to the end of the document's network address; the display instructions may be indicated as such by including a special character as an indicator (for example, "?" or "#"). The particular portion of the document may be specified based on the display instructions; for example, if a precision URL uses a format of "www.example.com/document?page5& window.scrollTo(−7px,+13px)," then the location is specified in the display instructions following the question mark after the document's network address (in this example, the display instructions may instruction overlay module 125 to scroll the document to an x-coordinate of −7 pixels, and a y-coordinate of +13 pixels, from a reference point on page 5). In some embodiments, the display instructions are sent to lookup server 150 and stored in database 160, where the display instructions are associated with a lookup code; in such case, the lookup code is then included in the precision URL in place of the display instructions.

The precision URL is sent to a recipient at operation 230. For example, a precision URL may be sent from client device 105A to client device 105N over network 135. A precision URL may be shared using any conventional communication mechanism, including e-mail, instant messaging applications, text messaging, and the like.

Figure 3:
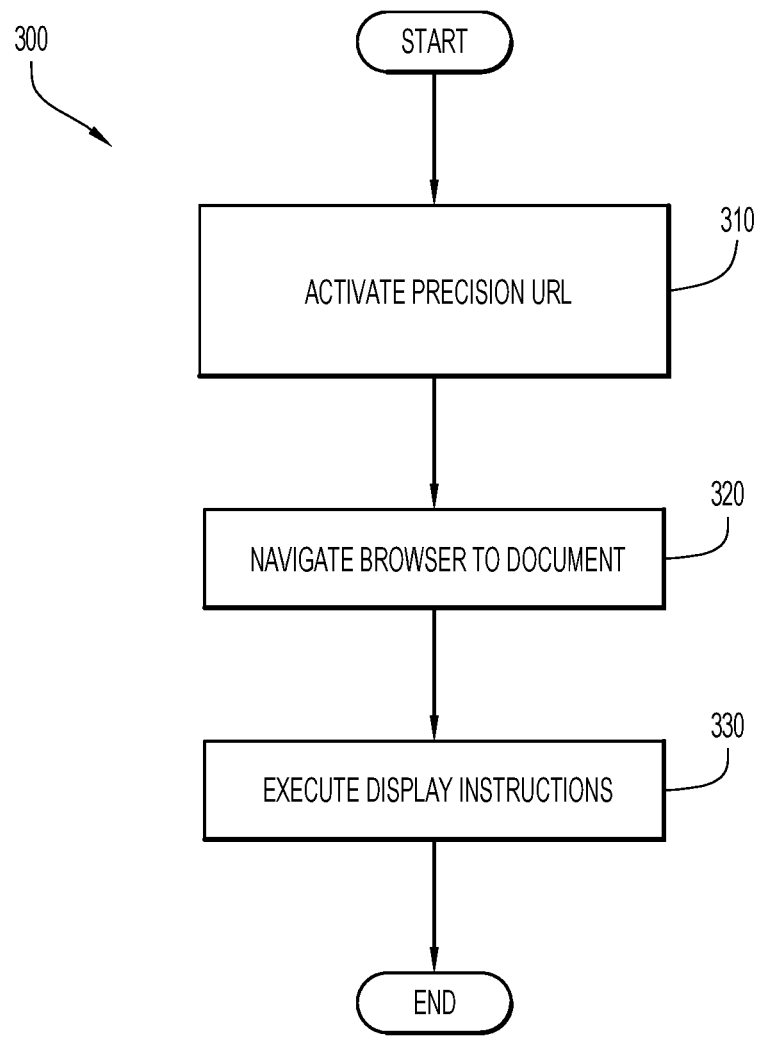
FIG. 3 is a flow chart depicting a method of activating a precision uniform resource locator in accordance with an embodiment of the present invention.

FIG. 3 is a flow chart depicting a method 300 of activating a precision URL in accordance with an embodiment of the present invention.

A precision URL is activated at operation 310. A user may encounter the precision URL on a network-accessible document (such as a web page), the user may receive the precision URL from a friend or colleague, or the user may have previously created and bookmarked the precision URL. A user may activate a precision URL on user device 105 using browser/interface module 120.

The browser is navigated to a document at operation 320. Browser/interface module 120 may navigate to the document using the address included in the precision URL. The address included in the precision URL may be a web address (such as a domain name), an Internet Protocol (IP) address, or any other address that causes browser/interface module 120 to locate a network-accessible document. Once browser/ interface module 120 locates the document specified by the precision URL, browser/interface module 120 fetches the document for display on user device 105.

The display instructions are executed at operation 330. The display instructions may be processed by overlay module 125 concurrently or after browser/interface module 120 has navigated to the document included in the precision URL. When browser/interface module 120 has fetched the document, overlay module 125 executes the display instructions. Overlay module 125 may embed the fetched document as an element inside of an overlay layer, and execute the display instructions using the overlay layer. Executing the display instructions within the overlay layer may cause overlay module 125 to jump the fetched document to the particular location in the document that is specified by the precision URL.

Overlay module 125 may execute display instructions that modify a specified portion of the linked document. For example, in addition to jumping to a particular location in a document, executing the display instructions may cause overlay module 125 to add highlighting to a specified portion of text. Similarly, the display instructions may instruct overlay module 125 to make a portion of text bold or italicized, or change a color scheme of the text. The display instructions may include instructions for overlay module 125 to add an arrow, circle, box, or any other type of shape, annotation, or markup to the fetched document. In addition, the display instructions may specify one or more colors for any of the highlighting, shapes, annotations, and the like.

In some embodiments, the display instructions may specify for overlay module 125 to isolate a portion of the document. For example, overlay module 125 may make the fetched document appear as only a portion of the document, such as a particular sentence or paragraph, or any arbitrary user-defined selection of text, without displaying any preceding or succeeding portions of the document. The display instructions may also provide instructions to display a comment adjacent to the linked portion of the document, including the body text of the comment and any formatting of the body text.

In some embodiments, a precision URL may include a lookup code instead of (or in addition to) display instructions. A lookup code enables the creation and sharing of precision URLs that are not lengthy. For example, if a comment having a large amount of body text is included as part of the display instructions, the resulting precision URL may be especially lengthy. Thus, when there is a lookup code associated with a precision URL, then user device 105 may request from lookup server 150 the display instructions that are associated with the lookup code; lookup module 155 may use the lookup code to search database 160 for the display instructions associated with the lookup code, and the display instructions may then be sent back to the requesting user device 105 for execution by overlay module 125.

Figure 4C:
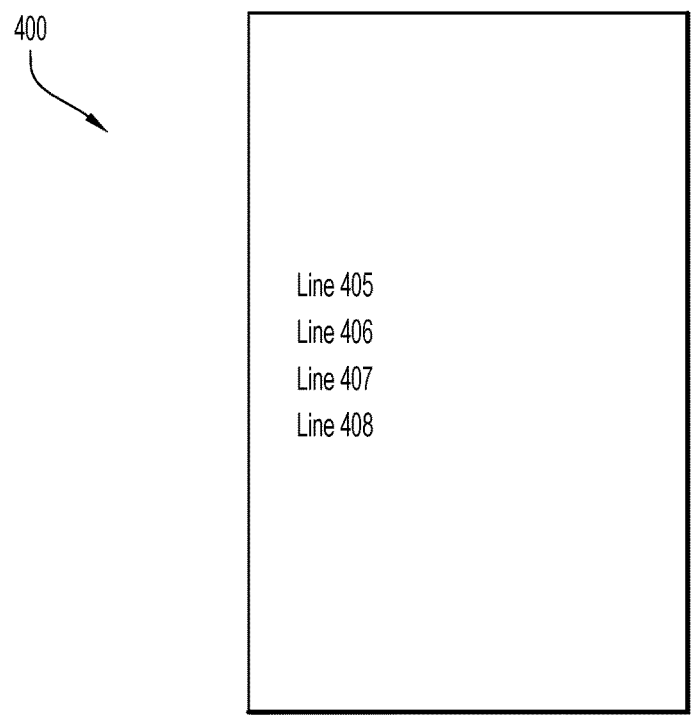

FIGS. 4A-4D depicts examples of a document 400 accessed using a precision URL in accordance with an embodiment of the present invention. FIG. 4A depicts an example of a document that is several hundred lines in length. As depicted, document 400 has been navigated to line 405 of document 400. When a user generates a precision URL linking to line 405 of document 400, activating the precision URL on any client device 105 will cause browser/interface module 120 to retrieve document 400, and overlay module 125 to navigate document 400 directly to line 405.

Figure 4D:
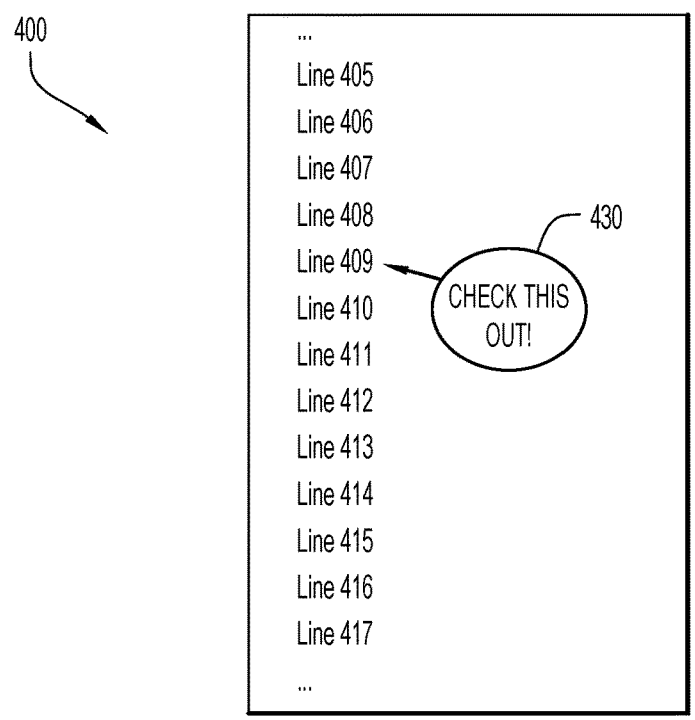

FIGS. 4B-4D depict examples of document 400 presented with additional display instructions. FIG. 4B depicts an example of document 400 with highlighting 420. In addition to specifying a location in the document, a user may specify to highlight a particular portion of the document. In the depicted example, the display instructions included in the precision URL have instructed lines 413-416 of document 400 to be highlighted. When a user generates a precision URL with highlighting, the user may also select one or more highlighting colors.

FIG. 4C depicts an example of a portion of document 400 that is isolated. The display instructions of a precision URL may contain instructions to isolate a selected portion of document 400. FIG. 4C depicts an example of document 400 with lines 405-408 presented in isolation from the rest of the document. Thus, lines of document 400 before line 405 and after line 408 are not presented in browser/interface module 120.

FIG. 4D depicts an example of document 400 with a comment. When a user creates a precision URL, link module 130 may prompt the user to insert a comment, such as comment 430. Comment 430 may overlap document 400 or be partially or completely contained in a margin of document 400. When a user inserts a comment, the user may provide text that comprises the body of the comment. In the depicted example, the body text of the comment 430 includes "Check this out!" and comment 430 is presented as an ellipse with an arrow indicating to a particular position in document 400, which may or may not be the position to which the precision URL links. For example, a precision URL may link to line 405 of document 400 to provide a context, with comment 430 drawing a user's attention in particular to line 409.

Figure 5:
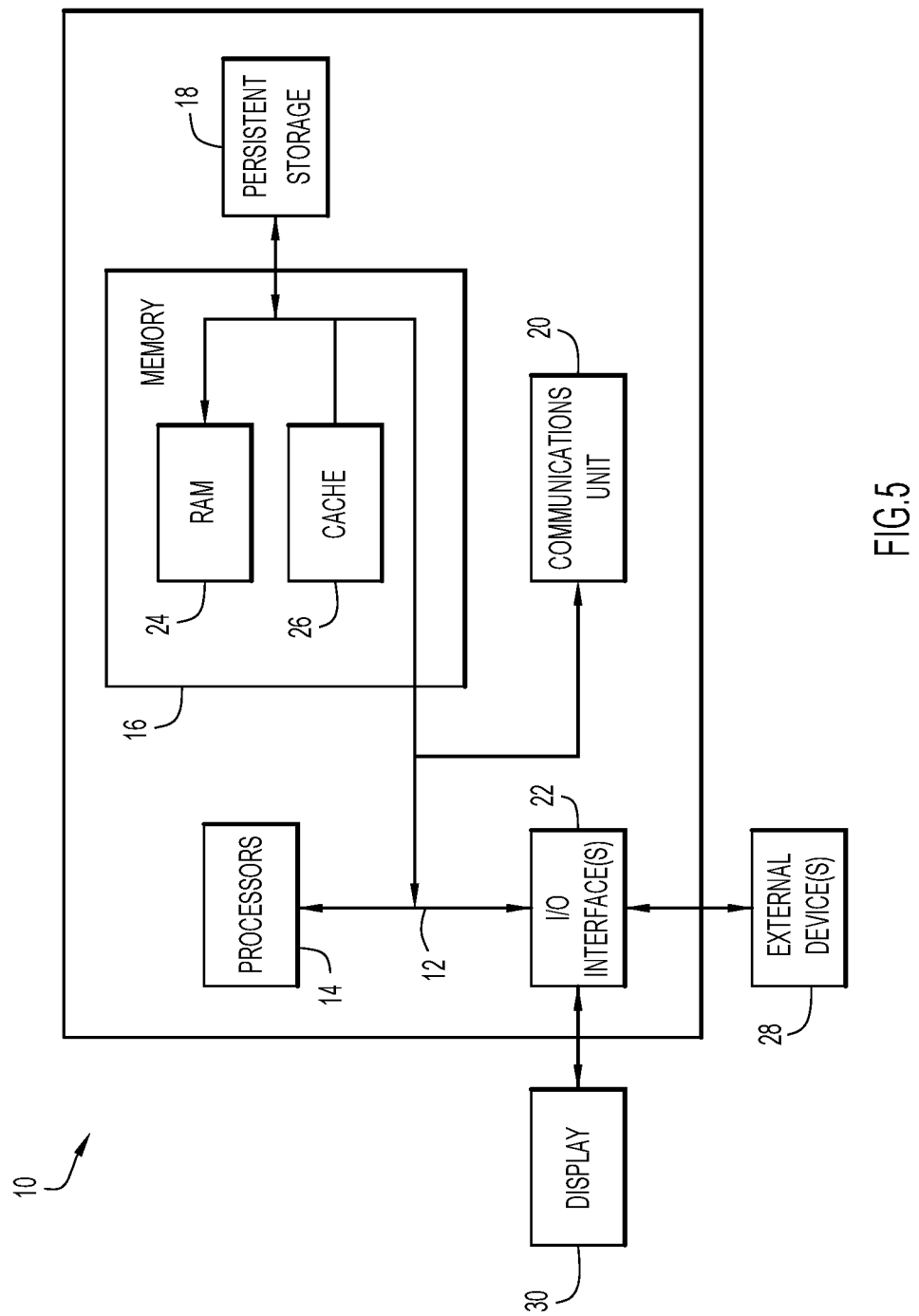
FIG. 5 is a block diagram depicting a computing device in accordance with an embodiment of the present invention.

FIG. 5 is a block diagram depicting components of a computer 10 suitable for executing the methods disclosed herein. Computer 10 may enable client device 105, server 140, and lookup server 150 for creating and accessing precision URLs in accordance with embodiments of the present invention. It should be appreciated that FIG. 5 provides only an illustration of an embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data, including precision URLs, document addresses, lookup codes, and display instructions, may be stored within any conventional or other data structures, such as files, arrays, lists, stacks, queues, records, and the like. The data may be stored in any desired storage unit, such as database, data or other repositories, queue, and the like. The data transmitted between each client device 105, server 140, and lookup server 150 may include any desired format and arrangement, and may include any quantity of any types of fields of any size to store the data. The definition and data model for any data, including precision URLs, document addresses, lookup codes, and display instructions, may indicate the overall structure in any desired fashion, such as computer-related languages, graphical representation, listing, and the like.

Data, including precision URLs, document addresses, lookup codes, and display instructions, may include any information provided to or by client device 105, server 140, and/or lookup server 150. The data may include any quantity of any types of fields of any size to store any desired data. The fields may indicate the presence, absence, actual values, or any other desired characteristics of the data of interest, such as quantity, value ranges, and the like. The data in a may indicate the overall structure in any desired fashion, including computer-related languages, graphical representation, listing, and the like.

The present invention embodiments may employ any number of any type of user interface (such as a Graphical User Interface (GUI), command-line, prompt, and the like) for obtaining or providing information, such as precision URLs, document addresses, lookup codes, and display instructions, where the interface may include any information arranged in any fashion. The interface may include any number of any types of input or actuation mechanisms, such as buttons, icons, fields, boxes, links, and the like. The input or actuation mechanisms may be disposed at any locations to enter/display information and initiate desired actions via any suitable input devices (such as a mouse, keyboard, and the like). The interface screens may include any suitable actuators (such as links, tabs, and the like) to navigate between the screens in any fashion.

It will be appreciated that the embodiments described above and illustrated in the drawings represent only a few of the many ways of accessing specific portions of documents residing on a network.

The environment of the present invention embodiments may include any number of computer or other processing systems (for example, client or end-user systems, server systems, and the like) and databases or other repositories arranged in any desired fashion, where the present invention embodiments may be applied to any desired type of computing environment, such as cloud computing, client-server, network computing, mainframe, stand-alone systems, and the like. The computer or other processing systems employed by the present invention embodiments may be implemented by any number of any personal or other type of computer or processing system, such as a desktop, laptop, PDA, mobile devices, and the like. The computer or other processing system may include any commercially available operating system and any combination of commercially available and custom software (including communications software, server software, browser/interface module 120, overlay module 125, link module 130, and lookup module 155). These systems may include any types of monitors and input devices (for example, a keyboard, mouse, voice recognition, and the like) to enter and/or view information.

It is to be understood that the software (including communications software, server software, browser/interface module 120, overlay module 125, link module 130, and lookup module 155) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium, such as LAN, WAN, Intranet, Internet, hardwire, modem connection, wireless, and the like. For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (including communications software, server software, browser/interface module 120, overlay module 125, link module 130, and lookup module 155) may be available on a non-transitory computer useable medium (such as magnetic or optical mediums, magneto-optic mediums, floppy diskettes, CD-ROM, DVD, memory devices, and the like) of a stationary or portable program product apparatus or device for use with stand-alone systems or systems connected by a network or other communications medium.

The communication network may be implemented by any number of any type of communications network (such as LAN, WAN, Internet, Intranet, VPN, and the like). The computer or other processing systems of the present invention embodiments may include any conventional or other communications devices to communicate over the network via any conventional or other protocols. The computer or other processing systems may utilize any type of connection (such as a wired, wireless, or fiber optic connection) for access to the network. Local communication media may be implemented by any suitable communication media, such as a local area network (LAN), hardwire, wireless link, Intranet, and the like.

The system may employ any number of any conventional or other databases, data stores or storage structures (including files, databases, data structures, data or other repositories, and the like) to store information, such as lookup codes and display instructions. The database system may be implemented by any number of any conventional or other databases, data stores or storage structures (including files, databases, data structures, data or other repositories, and the like) to store information, such as lookup codes and display instructions. The database system may be included within or coupled to the server and/or client systems. The database systems and/or storage structures may be remote from or local to the computer or other processing systems, and may store any desired data.

The present invention embodiments may employ any number of any type of user interface (such as a Graphical User Interface (GUI), command-line, prompt, and the like) for obtaining or providing any information, where the interface may include any information arranged in any fashion. The interface may include any number of any types of input or actuation mechanisms (for example, buttons, icons, fields, boxes, links, and the like) disposed at any locations to enter/display information and initiate desired actions via any suitable input devices (such as a mouse, keyboard, and the like). The interface screens may include any suitable actuators (such as links, tabs, and the like) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for accessing a document, the method comprising:
   receiving a link to a Hypertext Markup Language (HTML) document, wherein the link comprises one or more display instructions to navigate to a specific position within the document, and wherein the one or more display instructions are generated based on user input or activity that indicates the specific position within a document
   navigating to the document specified in the link;
   executing one or more display instructions specified by the link to modify the document by embedding the document within an overlay layer, wherein the one or more display instructions comprise instructions to cause the overlay layer to navigate the embedded document to the specific position specified by the link, and wherein the overlay layer is an HTML element; and
   present the modified document.

2. The computer-implemented method of claim 1, wherein executing the one or more display instructions to modify the document includes performing one or more of: adding highlighting to a portion of the document, circling a portion of the document, placing a box around a portion of the document, displaying a graphical indicator at a portion of the document, and changing a color scheme of a portion of the document.

3. The computer-implemented method of claim 1, wherein executing the one or more display instructions to modify the document comprises isolating a specified portion of the document.

4. The computer-implemented method of claim 1, wherein executing the one or more display instructions to modify the document comprises displaying a comment in a portion of the document.

5. The computer-implemented method of claim 1, wherein the link indicates a lookup code, the computer-implemented method further comprising:
   sending, to a lookup server, a request for one or more display instructions, wherein the request includes the lookup code; and
   receiving, from the lookup server, the one or more display instructions corresponding to the lookup code from the lookup server.

6. The computer-implemented method of claim 1, wherein the HTML element comprises an inline frame (iframe).

7. A computer system for accessing a document comprising:
- one or more computer processors;
- one or more computer readable storage media;
- program instructions stored on the one or more computer readable storage media for execution by at least one of the one or more computer processors, the program instructions comprising instructions to:
- receive a link to a Hypertext Markup Language (HTML) document, wherein the link comprises one or more display instructions to navigate to a specific position within the document, and wherein the one or more display instructions are generated based on user input or activity that indicates the specific position within a document;
- navigate to the document specified in the link;
- execute one or more display instructions specified by the link to modify the document by embedding the document within an overlay layer, wherein the one or more display instructions comprise instructions to cause the overlay layer to navigate the embedded document to the specific position specified by the link, and wherein the overlay layer is an HTML element; and
- present the modified document.

8. The computer system of claim 7, wherein the instructions to execute the one or more display instructions to modify the document include instructions to perform one or more of: adding highlighting to a portion of the document, circling a portion of the document, placing a box around a portion of the document, displaying a graphical indicator at a portion of the document, and changing a color scheme of a portion of the document.

9. The computer system of claim 7, wherein executing the one or more display instructions to modify the document comprises isolating a specified portion of the document.

10. The computer system of claim 7, wherein executing the one or more display instructions to modify the document comprises displaying a comment in a portion of the document.

11. The computer system of claim 7, wherein the link indicates a lookup code, and further comprising:
- sending, to a lookup server, a request for one or more display instructions, wherein the request includes the lookup code; and
- receiving, from the lookup server, the one or more display instructions corresponding to the lookup code from the lookup server.

12. The computer system of claim 7, wherein the HTML element comprises an inline frame (iframe).

13. A computer program product for accessing a document, the computer program product comprising one or more computer readable storage media collectively having program instructions embodied therewith, the program instructions executable by a computer to cause the computer to:
- receive a link to a Hypertext Markup Language (HTML) document, wherein the link comprises one or more display instructions to navigate to a specific position within the document, and wherein the one or more display instructions are generated based on user input or activity that indicates the specific position within a document;
- navigate to the document specified in the link;
- execute one or more display instructions specified by the link to modify the document by embedding the document within an overlay layer, wherein the one or more display instructions comprise instructions to navigate the embedded document to the specific position specified by the link, and wherein the overlay layer is an HTML element; and
- present the modified document.

14. The computer program product of claim 13, wherein the instructions to execute the one or more display instructions to modify the document include instructions to perform one or more of: adding highlighting to a portion of the document, circling a portion of the document, placing a box around a portion of the document, displaying a graphical indicator at a portion of the document, and changing a color scheme of a portion of the document.

15. The computer program product of claim 13, wherein executing the one or more display instructions to modify the document comprises isolating a specified portion of the document.

16. The computer program product of claim 13, wherein executing the one or more display instructions to modify the document comprises displaying a comment in a portion of the document.

17. The computer program product of claim 13, wherein the link indicates a lookup code, and further comprising:
- sending, to a lookup server, a request for one or more display instructions, wherein the request includes the lookup code; and
- receiving, from the lookup server, the one or more display instructions corresponding to the lookup code from the lookup server.

18. The computer program product of claim 13, wherein the HTML element comprises an inline frame (iframe).

* * * * *